US009817577B2

(12) United States Patent
Tomlin et al.

(10) Patent No.: US 9,817,577 B2
(45) Date of Patent: Nov. 14, 2017

(54) METHODS, DEVICES AND SYSTEMS FOR TWO STAGE POWER-ON MAP REBUILD WITH FREE SPACE ACCOUNTING IN A SOLID STATE DRIVE

(71) Applicants: Western Digital Technologies, Inc., Irvine, CA (US); Skyera, LLC, San Jose, CA (US)

(72) Inventors: Andrew J. Tomlin, Irvine, CA (US); Justin Jones, Irvine, CA (US); Rodney N. Mullendore, San Jose, CA (US)

(73) Assignees: Western Digital Technologies, Inc., San Jose, CA (US); Skyera, LLC, San Jose, CA (US)

( * ) Notice: Subject to any disclaimer, the term of this patent is extended or adjusted under 35 U.S.C. 154(b) by 0 days.

(21) Appl. No.: 15/275,670

(22) Filed: Sep. 26, 2016

(65) Prior Publication Data
US 2017/0010823 A1   Jan. 12, 2017

Related U.S. Application Data

(62) Division of application No. 13/786,352, filed on Mar. 5, 2013, now Pat. No. 9,454,474.

(51) Int. Cl.
*G06F 3/00* (2006.01)
*G06F 12/00* (2006.01)
(Continued)

(52) U.S. Cl.
CPC .......... *G06F 3/0607* (2013.01); *G06F 3/0659* (2013.01); *G06F 3/0688* (2013.01);
(Continued)

(58) Field of Classification Search
None
See application file for complete search history.

(56) References Cited

U.S. PATENT DOCUMENTS 6,856,556 B1   2/2005 Hajeck
7,126,857 B2   10/2006 Hajeck
(Continued)

FOREIGN PATENT DOCUMENTS

WO   WO-2012/014140 A2   2/2012

OTHER PUBLICATIONS

International Search Report and Written Opinion dated Jun. 19, 2014 from PCT/US2014/019681, 10 pages.

*Primary Examiner* — David X Yi
*Assistant Examiner* — Craig Goldschmidt
(74) *Attorney, Agent, or Firm* — McDermott Will & Emery LLP

(57) ABSTRACT

A data storage device comprises a non-volatile memory comprising a plurality of blocks, each configured to store a plurality of physical pages at predetermined physical locations. A controller programs and reads data stored in a plurality of logical pages. A volatile memory comprises a logical-to-physical address translation map configured to enabling determination of the physical location, within one or more physical pages, of the data stored in each logical page. A plurality of journals may be stored, each comprising a plurality of entries associating one or more physical pages to each logical page. At startup, the controller may read at least some of the plurality of journals in an order and rebuild the map; indicate a readiness to service data access commands after the map is rebuilt; rebuild a table from the map and, based thereon, select block(s) for garbage collection after having indicated the readiness to process the commands.

10 Claims, 10 Drawing Sheets

(51) Int. Cl.
*G06F 3/06* (2006.01)
*G06F 12/02* (2006.01)

(52) U.S. Cl.
CPC .......... *G06F 12/0246* (2013.01); *G06F 12/02* (2013.01); *G06F 12/0292* (2013.01); *G06F 2212/7201* (2013.01); *G06F 2212/7205* (2013.01)

(56) References Cited

U.S. PATENT DOCUMENTS

| | | |
|---|---|---|
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,774,525 B2 | 8/2010 | Farhan et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2003/0101327 A1 | 5/2003 | Beck |
| 2008/0077729 A1 | 3/2008 | Kim et al. |
| 2009/0150641 A1 | 6/2009 | Flynn et al. |
| 2009/0193184 A1 | 7/2009 | Yu et al. |
| 2010/0030999 A1 | 2/2010 | Hinz |
| 2010/0174849 A1 | 7/2010 | Walston et al. |
| 2010/0250793 A1 | 9/2010 | Syu |
| 2010/0332740 A1 | 12/2010 | Farhan et al. |
| 2011/0072194 A1 | 3/2011 | Forhan et al. |
| 2011/0099323 A1 | 4/2011 | Syu |
| 2011/0125954 A1 | 5/2011 | Yeh et al. |
| 2011/0283049 A1 | 11/2011 | Kang et al. |
| 2011/0296123 A1 | 12/2011 | Adler et al. |
| 2012/0054465 A1 | 3/2012 | Post et al. |
| 2012/0166759 A1 | 6/2012 | Wong |
| 2012/0198137 A1 | 8/2012 | Mothilal |
| 2012/0203958 A1 | 8/2012 | Jones et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0080732 A1 | 3/2013 | Nellans et al. |
| 2013/0091322 A1 | 4/2013 | Wang et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0082261 A1* | 3/2014 | Cohen .................. G11C 16/06 711/103 |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

L-PAGE #
L-Page 1 = E-Page 1003 Offset 800 Len 1,624 1003, 1004
L-Page 2 = E-Page 1004 Offset 400 Len 696 1004
L-Page 3 = E-Page 1004 Offset 1,120 Len 4,096 1004, 1005, 1006
L-Page 4 = E-Page 1006 Offset 1,144 Len 3,128 1006, 1007, 1008

E-PAGES NEEDED

METHODS, DEVICES AND SYSTEMS FOR TWO STAGE POWER-ON MAP REBUILD WITH FREE SPACE ACCOUNTING IN A SOLID STATE DRIVE

CROSS-REFERENCE TO RELATED APPLICATION(S)

This application is a divisional application of U.S. patent application Ser. No. 13/786,352, filed Mar. 5, 2013, the disclosure of which is hereby incorporated in its entirety by reference.

BACKGROUND

Due to the nature of flash memory in solid state drives (SSDs), data is typically programmed by pages and erased by blocks. A page in an SSD is typically 8-16 kilobytes (KB) in size and a block consists of a large number of pages (e.g., 256 or 512). Thus, a particular physical location in an SSD (e.g., a page) cannot be directly overwritten without overwriting data in pages within the same block, as is possible in a magnetic hard disk drive. As such, address indirection is needed. Conventional data storage device controllers, which manage the Flash memory on the data storage device and interfaces with the host system, use a Logical-to-Physical (L2P) mapping system known as logical block addressing (LBA) that is part of the Flash translation layer (FTL). When new data comes in replacing older data already written, the data storage device controller causes the new data to be written in a new location (as the data storage device cannot directly overwrite the old data) and update the logical mapping to point to the new physical location. At this juncture, the old physical location no longer holds valid data. As such, the old physical location will eventually need to be erased before it can be written again.

Conventionally, a large L2P map table maps logical entries to physical address locations on an SSD. This large L2P map table is usually saved in small sections as writes come in. For example, if random writing occurs, although the system may have to update only one entry, it may nonetheless have to save the entire table or a portion thereof, including entries that have not been updated, which is inherently inefficient.

FIG. 1 shows aspects of a conventional Logical Block Addressing (LBA) scheme for data storage devices. As shown therein, a map table 104 contains one entry for every logical block 102 defined for the data storage device's Flash memory 106. For example, a 64 GB data storage device that supports 512 byte logical blocks may present itself to the host as having 125,000,000 logical blocks. One entry in the map table 104 contains the current location of each of the 125,000,000 logical blocks in the Flash memory 106. In a conventional data storage device, a Flash page holds an integer number of logical blocks (i.e., a logical block does not span across Flash pages). In this conventional example, an 8 KB Flash page would hold 16 logical blocks (of size 512 bytes). Therefore, each entry in the logical-to-physical map table 104 contains a field 108 identifying the die on which the LBA is stored, a field 110 identifying the flash block on which the LBA is stored, another field 112 identifying the flash page within the flash block and a field 114 identifying the offset within the flash page that identifies where the LBA data begins in the identified Flash page. The large size of the map table 104 prevents the table from being held inside the SSD controller. Conventionally, the large map table 104 is held in an external DRAM connected to the SSD controller. As the map table 104 is stored in volatile DRAM, it must be restored when the SSD powers up, which can take a long time, due to the large size of the table.

When a logical block is written, the corresponding entry in the map table 104 is updated to reflect the new location of the logical block. When a logical block is read, the corresponding entry in the map table 104 is read to determine the location in Flash memory to be read. A read is then performed to the Flash page specified in the corresponding entry in the map table 104. When the read data is available for the Flash page, the data at the offset specified by the Map Entry is transferred from the Flash device to the host. When a logical block is written, the Flash memory holding the "old" version of the data becomes "garbage" (i.e., data that is no longer valid). It is to be noted that when a logical block is written, the Flash memory will initially contain at least two versions of the logical block; namely, the valid, most recently written version (pointed to by the map table 104) and at least one other, older version thereof that is stale and is no longer pointed to by any entry in the map table 104. These "stale" entries are referred to as garbage, which occupies space that must be accounted for, collected, erased and made available for future use. This process is known as "garbage collection".

Upon shutdown or other power-interrupting event, the contents of volatile memory in which the map table 104 is stored, are no longer valid. The map table 104, therefore, must be rebuilt. The goals of this process are 1) to create a coherent map of the logical to physical relationships and 2) to enable normal operation of the memory system. This normal operation should enable the servicing of data access commands by time-to-ready constraints and should enable the memory system to pick the best block for garbage collection operations. Picking the best block for garbage collection, in turn, involves accurately accounting for the free space within the memory blocks, among other possible factors.

The conventional method of rebuilding the map table 104 includes first initializing all memory locations within the volatile memory to zero, as RAM powers on in a random state (i.e., without valid ECC). Thereafter, the L2P map may be rebuilt from mapping information saved in the non-volatile memory while, at the same time, carrying out free space accounting. These operations involve lengthy random reads and random writes, which take a significant time, which ultimately delays the drive's time-to-ready for host reads and writes on power up. Conventionally, both the map rebuilding and the free space accounting must be completed before the drive is able to report to the host that it is ready to service data access commands.

DETAILED DESCRIPTION

System Overview

Figures 2, 3:
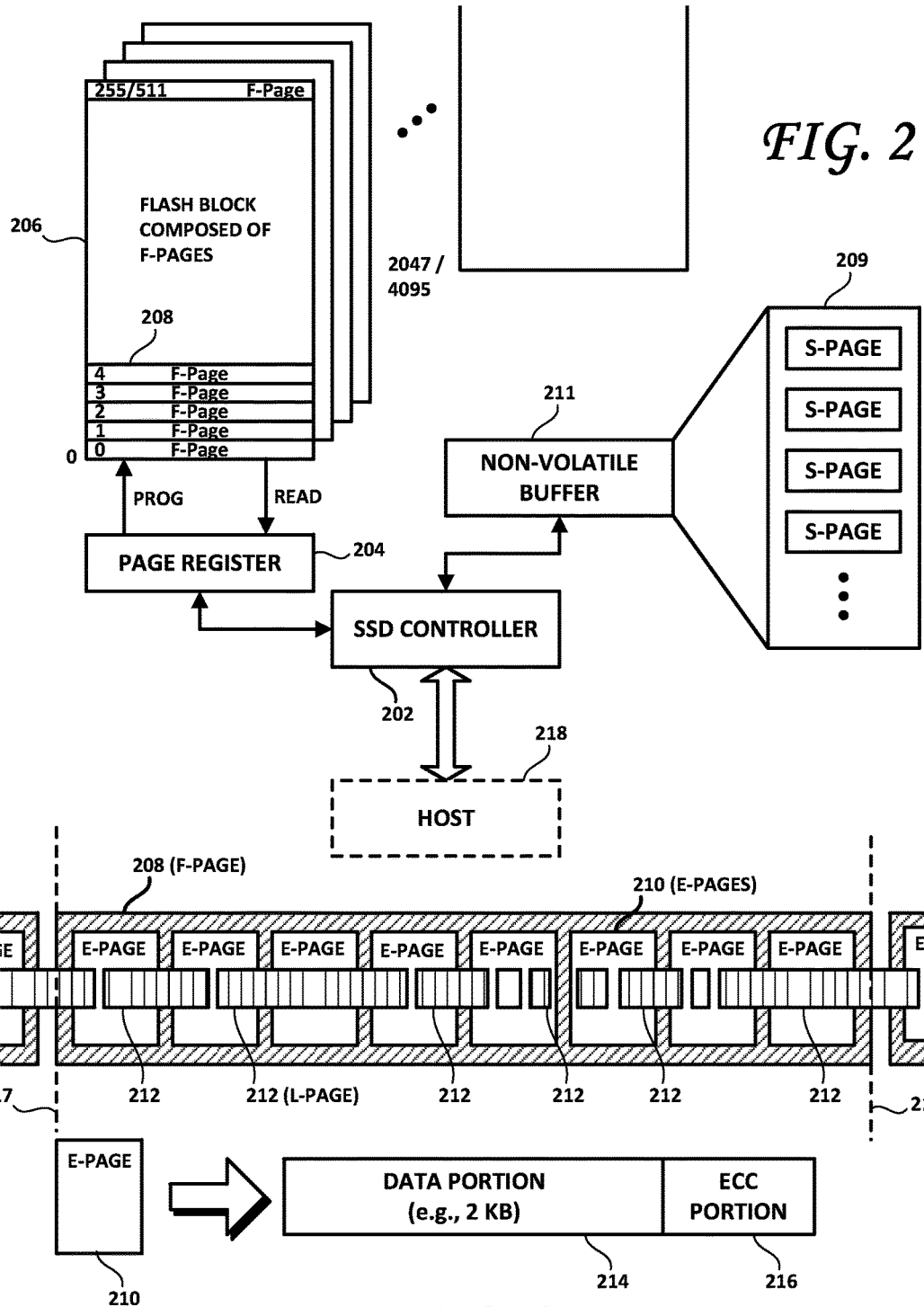
FIG. 2 is a block diagram of a data storage device according to one embodiment.
FIG. 3 is a diagram showing aspects of the physical and logical data organization of a data storage device according to one embodiment.

FIG. 2 is a diagram showing aspects of the physical and logical data organization of a data storage device according to one embodiment. In one embodiment, the data storage device is an SSD. In another embodiment, the data storage device is a hybrid drive including Flash memory and rotating magnetic storage media. The disclosure is applicable to both SSD and hybrid implementations, but for the sake of simplicity the various embodiments are described with reference to SSD-based implementations. A data storage device controller 202 according to one embodiment may be configured to be coupled to a host, as shown at reference numeral 218. The controller may comprise one or more processors that execute some or all of the functions described below as being performed by the controller. The host 218 may utilize a logical block addressing (LBA) scheme. While the LBA size is normally fixed, the host can vary the size of the LBA dynamically. For example, the LBA size may vary by interface and interface mode. Indeed, while 512 bytes is most common, 4 KB is also becoming more common, as are 512+ (520, 528, etc.) and 4 KB+ (4 KB+8, 4K+16, etc.) formats. As shown therein, the data storage device controller 202 may comprise or be coupled to a page register 204. The page register 204 may be configured to enable the controller 202 to read data from and store data to the data storage device. The controller 202 may be configured to program and read data from an array of flash memory devices responsive to data access commands from the host 218. While the description herein refers to flash memory, it is understood that the array of memory devices may comprise other types of non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

The page register 204 may be configured to enable the controller 202 to read data from and store data to the array. According to one embodiment, the array of flash memory devices may comprise a plurality of non-volatile memory devices in die (e.g., 128 dies), each of which comprises a plurality of blocks, such as shown at 206 in FIG. 2. Other page registers 204 (not shown), may be coupled to blocks on other die. A combination of Flash blocks, grouped together, may be called a Superblock or S-Block. In some embodiments, the individual blocks that form an S-Block may be chosen from one or more dies, planes or other levels of granularity. An S-Block, therefore, may comprise a plurality of Flash blocks, spread across one or more die, that are combined together. In this manner, the S-Block may form a unit on which the Flash Management System (FMS) operates. In some embodiments, the individual blocks that form an S-Block may be chosen according to a different granularity than at the die level, such as the case when the memory devices include dies that are sub-divided into structures such as planes (i.e., blocks may be taken from individual planes). According to one embodiment, allocation, erasure and garbage collection may be carried out at the S-Block level. In other embodiments, the FMS may perform data operations according to other logical groupings such as pages, blocks, planes, dies, etc.

In turn, each of the Flash blocks 206 comprises a plurality of Flash pages (F-Pages) 208. Each F-Page may be of a fixed size such as, for example, 16 KB. The F-Page, according to one embodiment, is the size of the minimum unit of program for a given Flash device. As shown in FIG. 3, each F-Page 208 may be configured to accommodate a plurality of physical pages, hereinafter referred to as E-Pages 210. The term "E-Page" refers to a data structure stored in Flash memory on which an error correcting code (ECC) has been applied. According to one embodiment, the E-Page 210 may form the basis for physical addressing within the data storage device and may constitute the minimum unit of Flash read data transfer. The E-Page 210, therefore, may be (but need not be) of a predetermined fixed size (such as 2 KB, for example) and determine the size of the payload (e.g., host data) of the ECC system. According to one embodiment, each F-Page 208 may be configured to fit a predetermined plurality of E-Pages 210 within its boundaries. For example, given 16 KB size F-Pages 208 and a fixed size of 2 KB per E-Page 210, eight E-Pages 210 fit within a single F-Page 208, as shown in FIG. 3. In any event, according to one embodiment, a power of 2 multiple of E-Pages 210, including ECC, may be configured to fit into an F-Page 208. Each E-Page 210 may comprise a data portion 214 and, depending on where the E-Page 210 is located, may also comprise an ECC portion 216. Neither the data portion 214 nor the ECC portion 216 need be fixed in size. The address of an E-Page uniquely identifies the location of the E-Page within the Flash memory. For example, the E-Page's address may specify the Flash channel, a particular die within the identified Flash channel, a particular block within the die, a particular F-Page and, finally, the E-Page within the identified F-Page.

To bridge between physical addressing on the data storage device and logical block addressing by the host, a logical page (L-Page) construct is introduced. An L-Page, denoted in FIG. 3 at reference numeral 212 may comprise the minimum unit of address translation used by the FMS. Each L-Page, according to one embodiment, may be associated with an L-Page number. The L-Page numbers of L-Pages 212, therefore, may be configured to enable the controller 202 to logically reference host data stored in one or more of the physical pages, such as the E-Pages 210. The L-Page 212 may also be utilized as the basic unit of compression. According to one embodiment, unlike F-Pages 208 and E-Pages 210, L-Pages 212 are not fixed in size and may vary in size, due to variability in the compression of data to be stored. Since the compressibility of data varies, a 4 KB amount of data of one type may be compressed into a 2 KB L-Page while a 4 KB amount of data of a different type may be compressed into a 1 KB L-Page, for example. Due to such compression, therefore, the size of L-Pages may vary within a range defined by a minimum compressed size of, for example, 24 bytes to a maximum uncompressed size of, for example, 4 KB or 4 KB+. Other sizes and ranges may be implemented. As shown in FIG. 3, L-Pages 212 need not be aligned with the boundaries of E-Page 210. Indeed, L-Pages 212 may be configured to have a starting address that is aligned with an F-Page 208 and/or E-Page 210 boundary, but also may be configured to be unaligned with either of the boundaries of an F-Page 208 or E-Page 210. That is, an L-Page starting address may be located at a non-zero offset from either the start or ending addresses of the F-Pages 208 or the start or ending addresses of the E-Pages 210, as shown in FIG. 3. As the L-Pages 212 are not fixed in size and may be smaller than the fixed-size E-Pages 210, more than one L-Page 212 may fit within a single E-Page 210. Similarly, as the L-Pages 212 may be larger in size than the E-Pages 210, L-Pages 212 may span more than one E-Page, and may even cross the boundaries of F-Pages 208, shown in FIG. 3 at numeral 217.

For example, where the LBA size is 512 or 512+ bytes, a maximum of, for example, eight sequential LBAs may be packed into a 4 KB L-Page 212, given that an uncompressed L-Page 212 may be 4 KB to 4 KB+. It is to be noted that, according to one embodiment, the exact logical size of an L-Page 212 is unimportant as, after compression, the physical size may span from few bytes at minimum size to thousands of bytes at full size. For example, for 4 TB SSD device, 30 bits of addressing may be used to address each L-Page 212 that could potentially be present in such a SSD.

Address Translation Map and Related Data Structures

Figure 4:
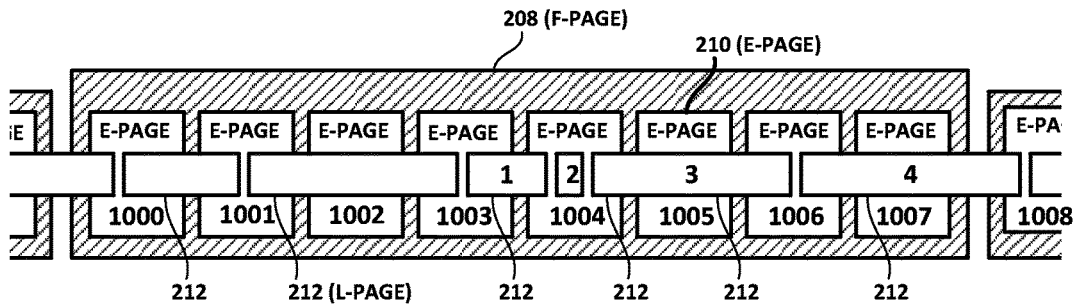
FIG. 4 shows a logical-to-physical address translation map and illustrative entries thereof, according to one embodiment.
Figure 4:
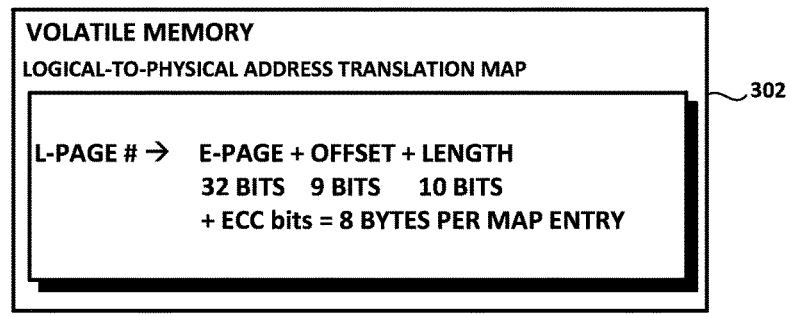

FIG. 4 shows a logical-to-physical address translation map and illustrative entries thereof, according to one embodiment. As the host data is referenced by the host in L-Pages 212 and as the data storage device stores the L-Pages 212 in one or more contiguous E-Pages 210, a logical-to-physical address translation map is required to enable the controller 202 to associate an L-Page number of an L-Page 212 to one or more E-Pages 210. Such a logical-to-physical address translation map is shown in FIG. 4 at 302 and, in one embodiment, is a linear array having one entry per L-Page 212. Such a logical-to-physical address translation map 302 may be stored in a volatile memory, such as a DRAM or SRAM. FIG. 4 also shows the entries in the logical-to-physical address translation map for four different L-Pages 212, which L-Pages 212 in FIG. 4 are associated with L-Page numbers denoted as L-Page 1, L-Page 2, L-Page 3 and L-Page 4. According to one embodiment, each L-Page stored in the data storage device may be pointed to by a single and unique entry in the logical-to-physical address translation map 302. Accordingly, in the example being developed herewith, four entries are shown. As shown at 302, each entry in the map 302 may comprise an L-Page number, which may comprise an identification of the physical page (e.g., E-Page) containing the start address of the L-Page being referenced, the offset of the start address within the physical page (e.g., E-Page) and the length of the L-Page. In addition, a plurality of ECC bits may provide error correction functionality for the map entry. For example, and as shown in FIG. 4, and assuming an E-Page size of 2 KB, L-Page 1 may be referenced in the logical-to-physical address translation map 302 as follows: E-Page 1003, offset 800, length 1624, followed by a predetermined number of ECC bits (not shown). That is, in physical address terms, the start of L-Page 1 is within (not aligned with) E-Page 1003, and is located at an offset from the starting physical location of the E-Page 1003 that is equal to 800 bytes. Compressed L-Page 1, furthermore, extends 1,624 bytes, thereby crossing an E-Page boundary to E-Page 1004. Therefore, E-Pages 1003 and 1004 each store a portion of the L-Page 212 denoted by L-Page number L-Page 1. Similarly, the compressed L-Page referenced by L-Page number L-Page 2 is stored entirely within E-Page 1004, and begins at an offset therein of 400 bytes and extends only 696 bytes within E-Page 1004. The compressed L-Page associated with L-Page number L-Page 3 starts within E-Page 1004 at an offset of 1,120 bytes (just 24 bytes away from the boundary of L-Page 2) and extends 4,096 bytes past E-Page 1005 and into E-Page 1006. Therefore, the L-Page associated with L-Page number L-Page 3 spans a portion of E-Page 1004, all of E-Page 1005 and a portion of E-Page 1006. Finally, the L-Page associated with L-Page number L-Page 4 begins within E-Page 1006 at an offset of 1,144 bytes, and extends 3,128 bytes to fully span E-Page 1007, crossing an F-Page boundary into E-Page 1008 of the next F-Page.

Collectively, each of these constituent identifier fields (E-Page, offset, length and ECC) making up each entry of the logical-to-physical address translation map 302 may be, for example, 8 bytes in size. That is, for an exemplary 4 TB drive, the address of the E-Page may be 32 bits in size, the offset may be 12 bits (for E-Page data portions up to 4 KB) in size, the length may be 10 bits in size and the ECC field may be provided. Other organizations and bit-widths are possible. Such an 8 byte entry may be created each time an L-Page is written or modified, to enable the controller 202 to keep track of the host data, written in L-Pages, within the Flash storage. This 8-byte entry in the logical-to-physical address translation map may be indexed by an L-Page number or LPN. In other words, according to one embodiment, the L-Page number functions as an index into the logical-to-physical address translation map 302. It is to be noted that, in the case of a 4 KB sector size, the LBA is the same as the LPN. The LPN, therefore, may constitute the address of the entry within the volatile memory. When the controller 202 receives a read command from the host 218, the LPN may be derived from the supplied LBA and used to index into the logical-to-physical address translation map 302 to extract the location of the data to be read in the Flash memory. When the controller 202 receives a write command from the host, the LPN may be constructed from the LBA and the logical-to-physical address translation map 302 may be modified. For example, a new entry therein may be created. Depending upon the size of the volatile memory storing the logical-to-physical address translation map 302, the LPN may be stored in a single entry or broken into, for example, a first entry identifying the E-Page containing the starting address of the L-Page in question (plus ECC bits) and a second entry identifying the offset and length (plus ECC bits). According to one embodiment, therefore, these two entries may together correspond and point to a single L-Page within the Flash memory. In other embodiments, the specific format of the logical-to-physical address translation map entries may be different from the examples shown above.

As the logical-to-physical address translation map 302 may be stored in a volatile memory, it necessarily must be rebuilt upon startup or any other loss of power to the volatile memory. This, therefore, requires some mechanism and information to be stored in a non-volatile memory that will enable the controller 202 to reconstruct the logical-to-physical address translation map 302 before the controller can "know" where the L-Pages are stored in the non-volatile memory after startup or after a power-fail event. According to one embodiment, such mechanism and information may be embodied in a construct that may be called a System Journal, or S-Journal. According to one embodiment, the controller 202 may be configured to maintain, in the plurality of non-volatile memory devices (e.g., in one or more of the blocks 206 in one or more die, channel or plane), a plurality of S-Journals defining physical-to-logical address correspondences. According to one embodiment, each S-Journal may cover a pre-determined range of physical pages (e.g., E-Pages). According to one embodiment, each S-Journal may comprise a plurality of journal entries, with each entry being configured to associate one or more physical pages, such as E-Pages, to the L-Page number of each L-Page. According to one embodiment, each time the controller 202 restarts or whenever the logical-to-physical address translation map 302 must be rebuilt, the controller 202 reads the S-Journals and, from the information read from the S-Journal entries, rebuilds the logical-to-physical address translation map 302.

Figure 5:
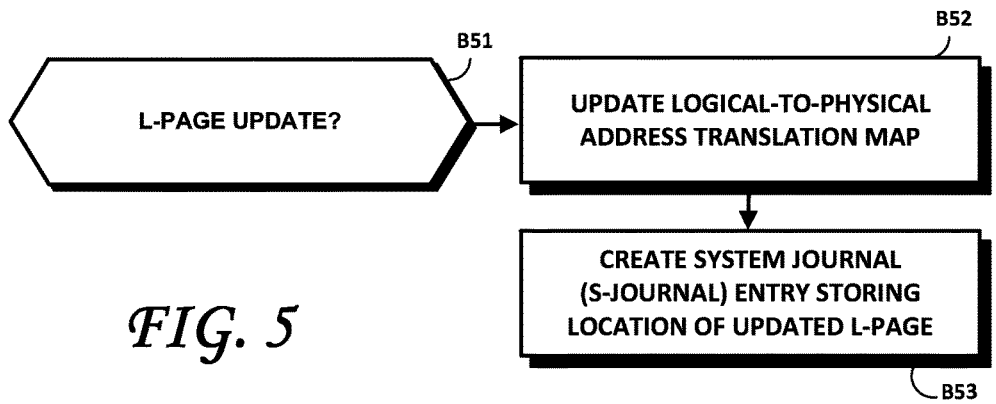
FIG. 5 shows aspects of a method for updating a logical-to-physical address translation map and for creating an S-Journal entry, according to one embodiment.

FIG. 5 shows aspects of a method for updating a logical-to-physical address translation map and for creating an S-Journal entry, according to one embodiment. As shown therein, to ensure that the logical-to-physical address translation map 302 is kept up-to-date, whenever an L-Page is written or otherwise updated as shown at block B51, the logical-to-physical address translation map 302 may be updated as shown at B52. As shown at B53, an S-Journal entry may also be created, storing therein information pointing to the location of the updated L-Page. In this manner, both the logical-to-physical address translation map 302 and the S-Journals are updated when new writes occur (e.g., as the host issues writes to non-volatile memory, as garbage collection/wear leveling occurs, etc.). Write operations to the non-volatile memory devices to maintain a power-safe copy of address translation data may be configured, therefore, to be triggered by newly created S-Journal entries (which may be just a few bytes in size) instead of re-saving all or a portion of the logical-to-physical address translation map, such that Write Amplification (WA) is reduced. The updating of the S-Journals ensure that the controller 202 can access a newly updated L-Page and that the logical-to-physical address translation map 302 may be reconstructed upon restart or other information-erasing power event affecting the non-volatile memory in which the logical-to-physical address translation map is stored. Moreover, in addition to their utility in rebuilding the logical-to-physical address translation map 302, the S-Journals are useful in enabling effective Garbage Collection (GC). Indeed, the S-Journals may contain the last-in-time update to all L-Page numbers, and may also contain stale entries, entries that do not point to a valid L-Page.

Figure 6:
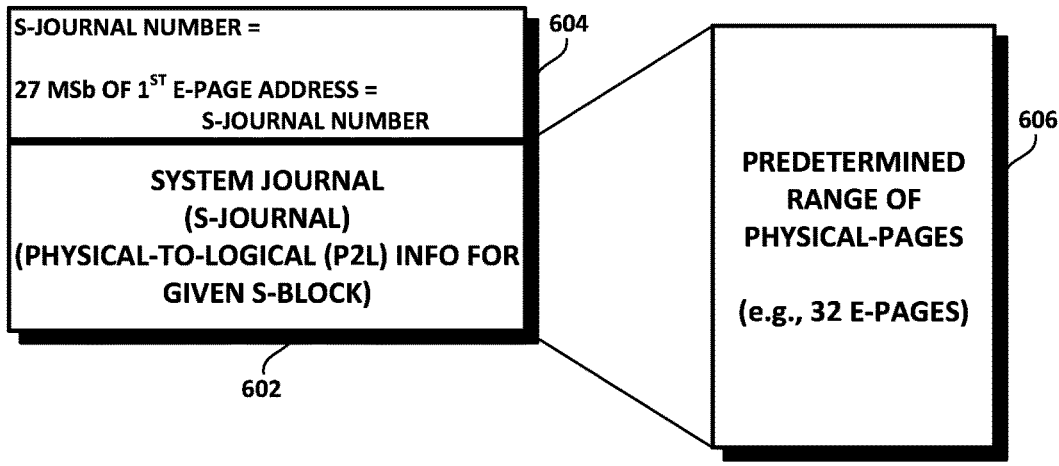
FIG. 6 is a block diagram of an S-Journal, according to one embodiment.

According to one embodiment, the S-Journal may constitute the main flash management data written to the media. According to one embodiment, S-Journals may contain mapping information for a given S-Block and may contain the Physical-to-Logical (P2L) information for a given S-Block. FIG. 6 is a block diagram showing aspects of an S-Journal, according to one embodiment. As shown therein and according to one embodiment, each S-Journal 602 covers a predetermined physical region of the non-volatile memory such as, for example, 32 E-Pages as shown at 606, which are addressable using 5 bits. Each S-Journal 602 may be identified by an S-Journal Number 604. The S-Journal Number 604 used for storing P2L information for host data may comprise a portion of the address of the first physical page covered by the S-Journal. For example, the S-Journal Number of S-Journal 602 may comprise, for example, the 27 MSbs of the first E-Page covered by this S-Journal 602.

Figure 7:
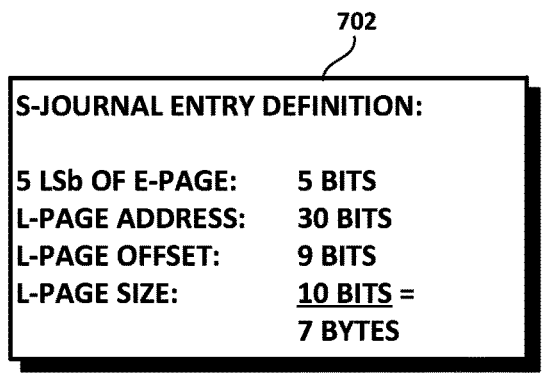
FIG. 7 shows an exemplary organization of one entry of an S-Journal, according to one embodiment.

FIG. 7 shows an exemplary organization of one entry 702 of an S-Journal 602, according to one embodiment. Each entry 702 of the S-Journal 602 may point to the starting address of one L-Page, which is physically addressed in E-Pages. Each entry 702 may comprise, for example, a number (5, for example) of LSbs of the E-Page containing the starting E-Page of the L-Page. The full E-Page address may be obtained by concatenating these 5 LSbs with the 27 MSbs of the S-Journal Number in the header. The entry 702 may then comprise the L-Page number, its offset within the identified E-Page and its size. For example, each entry 702 of a data band S-Journal 602 may comprise the 5 LSbs of the first E-Page covered by this S-Journal entry, 30 bits of L-Page number, 9 bits of E-Page offset and 10 bits of L-Page size, adding up to an overall size of about 7 bytes. Various other internal journal entry formats may be used in other embodiments.

According to one embodiment, due to the variability in the compression or the host configuration of the data stored in L-Pages, a variable number of L-Pages may be stored in a physical area, such as a physical area equal to 32 E-Pages, as shown at 606 in FIG. 6. As a result of the use of compression and the consequent variability in the sizes of L-Pages, S-Journals 602 may comprise a variable number of entries. For example, according to one embodiment, at maximum compression, an L-Page may be 24 bytes in size and an S-Journal 602 may comprise over 2,500 entries, referencing an equal number of L-Pages, one L-Page per S-Journal entry 702.

Figure 8:
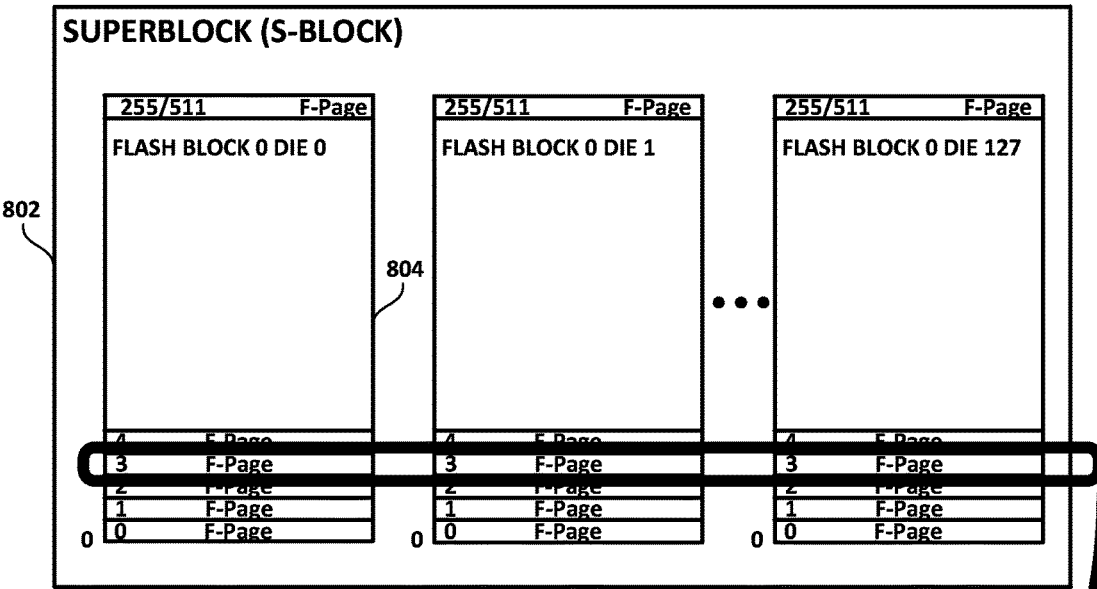
FIG. 8 is a block diagram of a superblock (S-Block), according to one embodiment.
Figure 9:
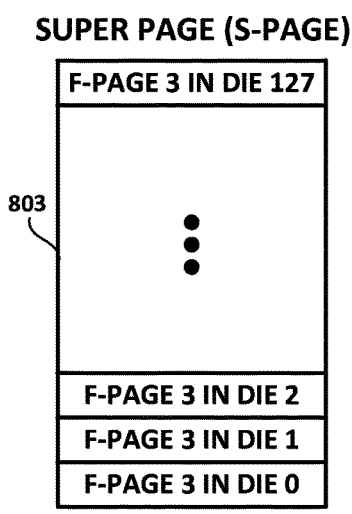
FIG. 9 shows another view of a Super page (S-page), according to one embodiment.

As noted above, S-Journals 602 may be configured to contain mapping information for a given S-Block and may contain the P2L information for a given S-Block. More precisely, according to one embodiment, S-Journals 602 may contain the mapping information for a predetermined range of E-Pages within a given S-Block. FIG. 8 is a block diagram of a superblock (S-Block), according to one embodiment. As shown therein, an S-Block 802 may comprise one Flash block (F-Block) 804 (as also shown at 206 in FIG. 2) per die. An S-Block 802, therefore, may be thought of as a collection of F-Blocks 804, one F-Block per die, that are combined together to form a unit of the Flash Management System. According to one embodiment, allocation, erasure and GC may be managed at the Superblock level. Each F-Block 804, as shown in FIG. 8, may comprise a plurality of Flash pages (F-Page) such as, for example, 256 or 512 F-Pages. An F-Page, according to one embodiment, may be the size of the minimum unit of program for a given non-volatile memory device. FIG. 9 shows a Super Page (S-Page), according to one embodiment. As shown therein, an S-Page 803 may comprise one F-Page per block of an S-Block, meaning that an S-Page 803 spans across an entire S-Block 802.

Figure 10A:
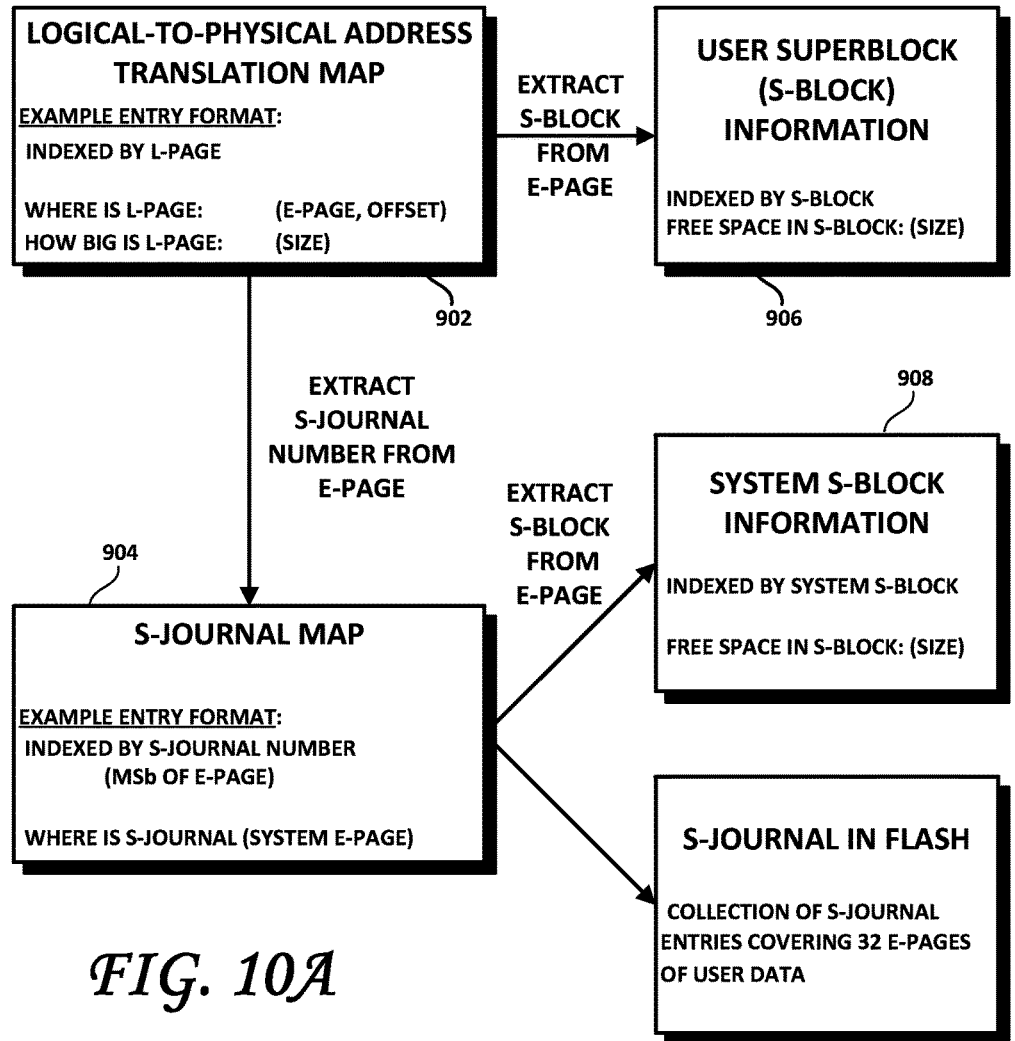
FIG. 10A shows relationships between the logical-to-physical address translation map, S-Journals and S-Blocks, according to one embodiment.

FIG. 10A shows relationships between the logical-to-physical address translation map, S-Journals and S-Blocks, according to one embodiment. Reference 902 denotes the logical-to-physical address translation map. According to one embodiment, the logical-to-physical address translation map 902 may be indexed by L-Page number, in that there may be one entry in the logical-to-physical address translation map 902 per L-Page in the logical-to-physical address translation map. The physical address of the start of the L-Page in the Flash memory and the size thereof may be given in the map entry; namely by E-Page address, offset within the E-Page and the size of the L-Page. As noted earlier, the L-Page, depending upon its size, may span one or more E-Pages and may span F-Pages and blocks as well.

As shown at 904, the volatile memory (e.g., DRAM) may also store an S-Journal map. An entry in the S-Journal map 904 stores information related to where an S-Journal is physically located in the non-volatile memory. For example, the 27 MSbs of the E-Page physical address where the start of the L-Page is stored may constitute the S-Journal Number. The S-Journal map 904 in the volatile memory may also include the address of the S-Journal in non-volatile memory, referenced in system E-Pages. From the S-Journal map 904 in volatile memory, System S-Block Information 908 may be extracted. The System S-Block Information 908 may be indexed by System S-Block (S-Block in the System Band) and may comprise, among other information regarding the S-Block, the size of any free or used space in the System S-Block. Also from the S-Journal map 904, the physical location of the S-Journals in non-volatile memory 910 may be extracted.

The System Band, according to one embodiment, does not contain L-Page data and may contain all File Management System (FMS) meta-data and information. The System Band may be configured as lower-page only for reliability and power fail simplification. During normal operation, the System Band need not be read except during Garbage Collection. According to one embodiment, the System Band may be provided with significantly higher overprovisioning than the data band for overall WA optimization. Other bands may include the Hot Band, which may contain L-Page data and is frequently updated, and the Cold Band, which is a physical area of memory storing static data retained from the garbage collection process, which may be infrequently updated. According to one embodiment, the System, Hot and Cold Bands may be allocated by controller firmware on an S-Block basis.

As noted above, each of these S-Journals in non-volatile memory may comprise a collection of S-Journal entries and cover, for example, 32 E-Pages worth of data. These S-Journals in non-volatile memory 910 enable the controller 202 to access the S-Journals entries in non-volatile memory upon startup, enable the controller 202 to rebuild in volatile memory not only the logical-to-physical address translation map 902, but also the S-Journal map 904, the S-Block Information 906, and the System S-Block Information 908.

The S-Journals in non-volatile memory may also contain all of the stale L-Page information, thereby enabling the controller 202 to GC after the logical-to-physical address translation map 902 and the S-Journal Map 904 in volatile memory are rebuilt. The S-Journals, therefore, may be said to contain a sequential history of all updates, over time, to the logical-to-physical address translation map 902.

Figure 10B:
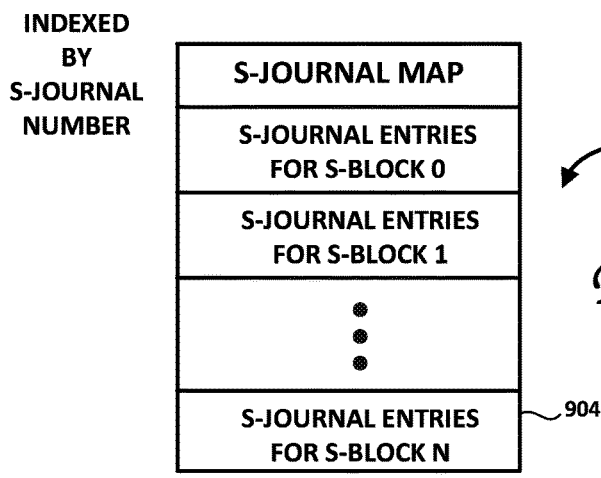
FIG. 10B is a block diagram of an S-Journal Map, according to one embodiment.

FIG. 10B is a block diagram of another view of an S-Journal Map 904, according to one embodiment. The S-Journal Map 904 may reference a plurality of S-Journal entries for each S-Block. According to one embodiment, the S-Block Number may be the MSb of the S-Journal Number. The size of the S-Journal map 904 may be correlated to the number of S-Blocks times the number of S-Journal entries per S-Block. Indexing into the S-Journal Map 904, therefore, may be carried out by referencing the S-Block Number (the MSb of the S-Journal Number) and the S-Journal entry for that S-Block number. The controller 202 may be further configured to build or rebuild a map of the S-Journals and store the resulting S-Journal Map 904 in volatile memory. For example, upon restart or upon the occurrence of another event in which power fails or after a restart subsequent to error recovery, the controller 202 may read the plurality of S-Journals in a predetermined sequential order, build a map of the S-Journals stored in the non-volatile memory devices based upon the sequentially read plurality of S-Journals, and store the built S-Journal Map 904 in the volatile memory. In particular, the rebuilt S-Journal Map 904 may be configured to contain the physical location for the most recently-written version of each S-Journal. Indeed, according to one embodiment, in rebuilding the S-Journal Map 904, the physical location of older S-Journals may be overwritten when a newer S-Journal is found. Stated differently, according to one embodiment, the S-Journal Map 904 may be rebuilt by the processor 202 based upon read S-Journals that are determined to be valid.

Two-Stage Map Rebuilding

According to one embodiment, at power-on, the address translation map rebuilding and the free space accounting may be split into two distinct stages. In a first stage, the address translation map may be rebuilt from the S-Journals stored in the System Band of the non-volatile memory. As noted above, the System Band may be that portion of the non-volatile memory that contains the FMS meta-data and information. For reliability and for simplification of post-power power-fail operations, the System Band may be configured for lower page only operation, thereby avoiding any possibility of lower page corruption of MLC Flash memory. Moreover, the System Band may be significantly more over-provisioned than the Data Band (which stores all L-Page data and contains both the Hot and Cold Bands) for overall WA optimization.

Figure 11:
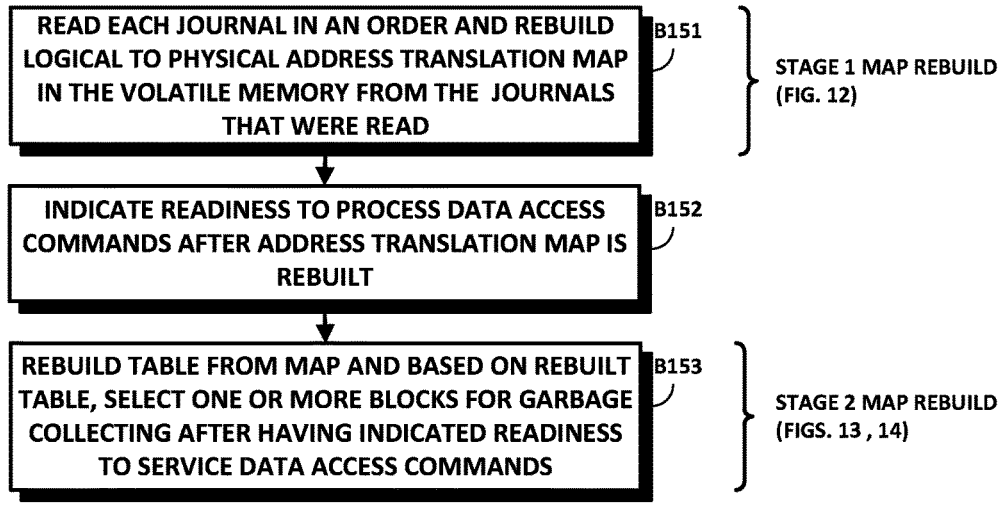
FIG. 11 is a flowchart of a method of carrying out a two-stage power-on logical-to-physical map rebuild, according to one embodiment.

According to one embodiment and as shown at B151 of FIG. 11, to rebuild the logical-to-physical address translation map 902, all of the S-Journals may be read. Reading all of the S-Journals enables the controller 202 to extract, from each entry of each S-Journal, the size and exact physical location of each L-Page associated with each L-Page Number. In one embodiment, after all S-Journals are read and the physical-to-logical information extracted therefrom and is stored in the logical-to-physical address translation map 902 in volatile memory, the controller 202 will have accounted for and mapped all of the L-pages stored in the entire non-volatile memory. How many S-Journals are read depends at least in part upon the range of physical pages covered by each S-Journal (e.g., 32 E-Pages, according to one embodiment), as well as the size of the non-volatile memory. Moreover and according to one embodiment, the S-Journal construct may be used to store information related to a virtual address range and for storing other file management tables in the volatile memory.

Figure 12:
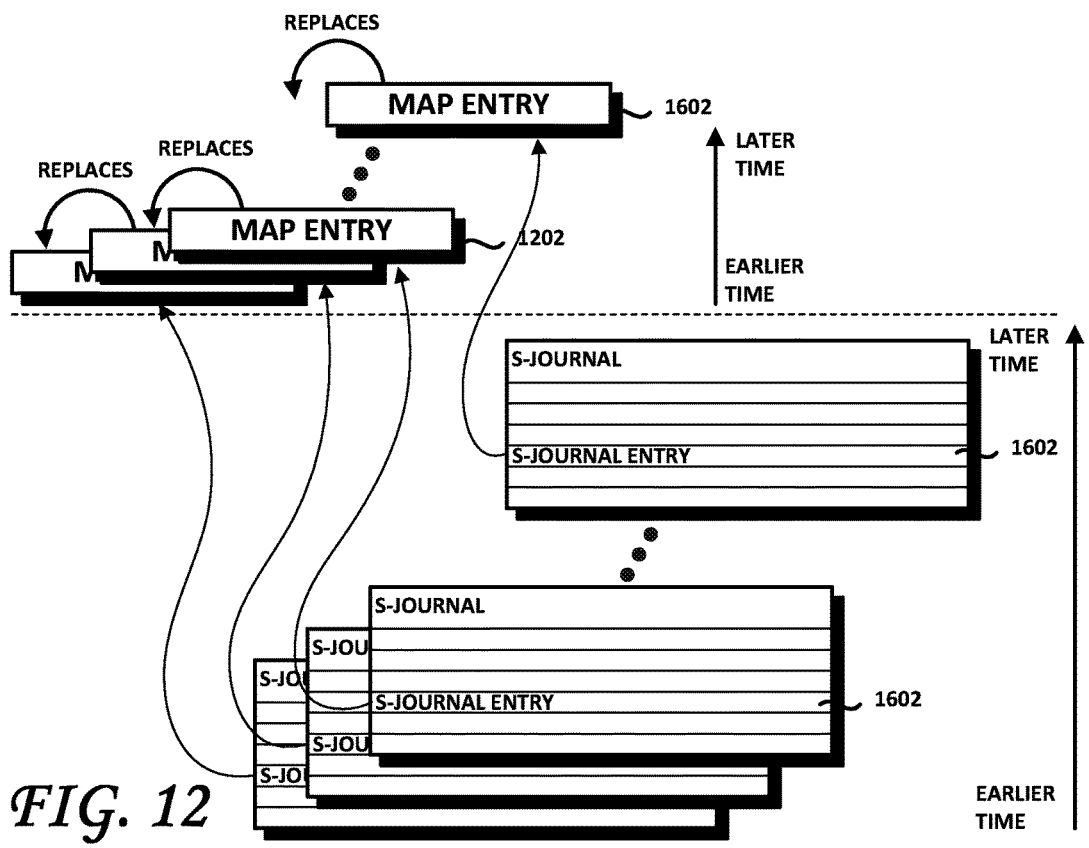
FIG. 12 is a block diagram illustrating further aspects of a method of carrying out a two-stage power-on logical-to-physical map rebuild, according to one embodiment.

As the S-Journals, according to one embodiment, may be configured to collectively contain all of the physical-to-logical information, and since many L-pages are likely to have been updated many times, the order in which the S-Journals are read is significant. Indeed, as the S-Journals may be configured to collectively store a complete history of updates to the L-Pages (at least since a last garbage collecting of the S-Block in which the L-Pages are stored), the S-Journals are read in one embodiment in the order in which they were created, as indicated at Block B151. This is graphically shown in FIG. 12, in which a L2P translation map entry 1602 generated from an earlier in time S-Journal entry is sequentially replaced by a corresponding map entry 1602 in a comparatively later-created S-Journal entry for the same L-Page, as the S-Journals are read in order. In this manner, should (as is likely) there have been several updates to a particular L-Page, reading the S-Journals in the order in which they were created ensures that invalid S-Journal entries (i.e., S-Journal entries that do not point to the current location of the L-Page) are read before valid entries (i.e., S-Journal entries that do point to the current location of the L-Page). This in turn ensures that the latest in time S-Journal entry for a particular L-Page is used as a basis of creating a valid map entry 1602 for that L-Page. This sequential reading of the S-Journals in the order in which they were created and ensuring that the last-read S-Journal entry for an L-Page is the most current one, ensure that the rebuilt logical-to-physical address translation map 902 is coherent; that is, accurately maps the logical pages to the correct physical locations within the non-volatile memory. According to one embodiment, as the S-Journals stored in non-volatile memory are read, the S-Journal Map 904 (see FIG. 10B) may also be reconstructed, from the S-Journal Number and address of each read S-Journal. The S-Journal Map 904 may be stored in the volatile memory.

According to one embodiment, in a first stage of one embodiment of the two stage process shown and described herein, the controller 202 may be configured, at startup, to read each of the plurality of S-Journals in the order in which they were created as shown at B151 and to rebuild the logical-to-physical address translation map 902 in the volatile memory from the read plurality of journals. That is, the controller 202 may, from the read S-Journal entries, populate the logical-to-physical address translation map 902 with the physical location information (e.g., a length and starting address within an E-Page in non-volatile memory) of each L-Page, such as also shown at 302 in FIG. 4. In this manner, each L-Page stored in the data storage device may be pointed to by a single and unique entry in the logical-to-physical address translation map 902. According to one embodiment, the controller 202 may carry out a write operation (e.g., an 8 byte write) to the volatile memory for each entry in each of the read S-Journals. It is to be understood, however, that embodiments are not limited to the exemplary 8 byte size shown and described herein and that other implementations are possible.

According to one embodiment, after all S-Journals have been read and as the logical-to-physical address translation map 902, the S-Journal map 904 and any required tables have been rebuilt in volatile memory, the data storage device may report its readiness to process data access commands to the host(s) 218, as shown at B152. Note that the data storage device, at the completion of this first stage, has not yet carried out any free space accounting operations and thus may not yet be ready to optimally carry out garbage collecting operations. Indeed, in an embodiment where optimal block selection for garbage collection depends at least in part on free space within the individual S-Blocks, the controller 202, at the end of this first stage, does not yet know which is the optimal S-Block to garbage collect, as the free space accounting has not yet been carried out. One of the considerations in choosing an S-Block for garbage collection activities may comprise ascertaining the amount of free space available in each S-Block. For example, the controller 202 may select an S-Block having the greatest amount of free space as the next S-Block on which to carry out garbage collection activities. Note that, according to one embodiment, the controller 202 may also identify the next best S-Block to garbage collect, as well as the next best S-Block after that, and so on.

Figures 13, 14:
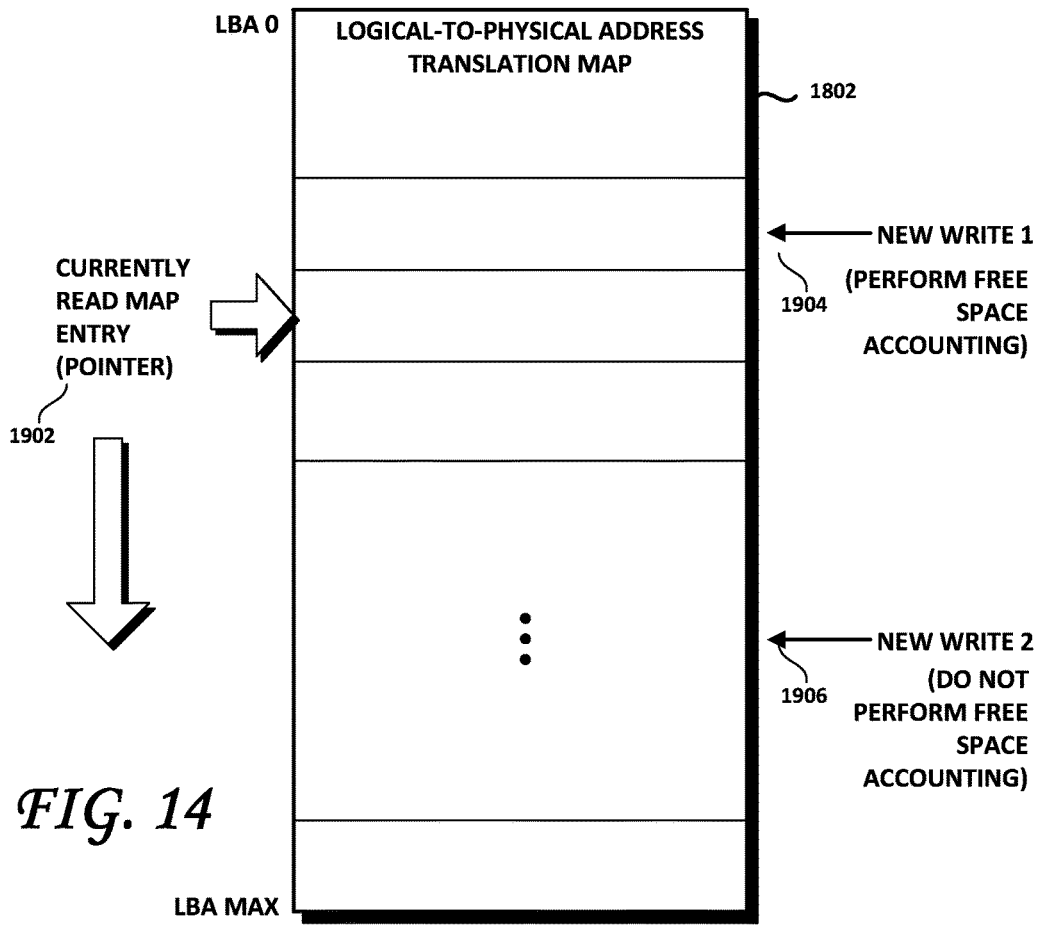
FIG. 13 is a representation of a valid size information table, according to one embodiment.
FIG. 14 is a block diagram illustrating aspects of a method of carrying out a two-stage power-on logical-to-physical map rebuild with free space accounting, according to one embodiment.

According to one embodiment, after at least the logical-to-physical address translation map 902 has been rebuilt, and after the data storage device has reported its readiness to process data access commands, the second stage of the present two-stage power on procedure may be carried out. According to one embodiment, after at least the logical-to-physical address translation map 902 has been rebuilt, and after the data storage device has reported its readiness to process data access commands, one or more tables may be rebuilt from the rebuilt logical-to-physical address translation map 902 and, based on such rebuilt table(s), one or more of the plurality of S-Blocks may be selected for garbage collection, as shown at B153 in FIG. 11. To do so, the controller 202 may, among other possible actions, rebuild a free space table containing an amount of free space in each of the plurality of S-Blocks after the logical-to-physical address translation map 902 has been rebuilt. To rebuild such free space table(s), the amount of free space in each of the plurality of blocks may be calculated. Instead of the controller 202 tracking the amount of free space in each S-Block, the controller 202 may, according to one embodiment, track the amount of valid data in each S-Block. Such information for each S-Block may be readily available in the logical-to-physical address translation map 902, which may be configured to contain a record of the size of each L-page in the non-volatile memory. From the amount of valid data in each S-Block and with the knowledge of the size of the S-Blocks, the controller 202 may calculate the amount of free space in each S-Block by subtracting the size of the valid data in each S-Block (obtained from reading the logical-to-physical address translation map 902) from the predetermined size of the S-Blocks. The difference between the amount of valid data stored in an S-Block and its size may be equal to or related to the amount of free space within each S-Block. Therefore, from a single sequential read of the logical-to-physical address translation map 902 or by updating the amount of valid data in each S-Block as the logical-to-physical address translation map 902 is being rebuilt, the amount of free space in each S-Block may be calculated by the controller 202. The accumulated (i.e., summed across entries in the logical-to-physical address translation map 902) amount of valid space in each S-Block may be stored, for example, in a table maintained in the volatile memory. For example, the system block information table 908 (see, for example, FIG. 10A) may be used for that purpose. Alternatively, the controller 202 may create and populate a separate valid size information table with the accumulated size of valid data for each S-Block. As shown in the table 1702 of FIG. 13, in this example, S-Block 1 has a total of 450 MB of valid data stored therein and S-Block 2 has a total of 1.5 GB of valid data stored therein. As the size of the S-Blocks is known a priori, the amount of free space in each S-Block may be readily calculated. In another embodiment, the amount of free space calculation is performed by directly summing the amount of free space based on the information from the logical-to-physical translation map 902.

According to one embodiment, the data storage device reports that it is ready to process host commands shortly after having completed the rebuild of the logical-to-physical address translation map 902 (and optionally other housekeeping activities such as populating the S-Journal map 904 and other tables in volatile memory). In such an embodiment the data storage device is configured to carry out free space accounting operations (including, e.g., rebuilding the free space table(s)) while and/or after processing host (i.e., data access) commands. Such incoming host commands may alter the free space accounting of the S-Blocks while the second stage is performed. One embodiment accounts for such changes in the amount of valid data that is present in each S-Block.

For example, after the rebuilding of the logical-to-physical address translation map 902, the map 902 may be sequentially read, from a beginning to the end thereof. The controller 202 may be configured to track a pointer during the reading of the now-coherent logical-to-physical address translation map 902, as shown at 1902 in FIG. 14. According to one embodiment, in carrying out such free space accounting while processing host commands, the controller 202 may be configured to act differently depending whether the L-Page that is modified as a result of a write command is associated with an L-Page Number that has already been processed for free space accounting by the controller 202 or that is associated with an L-Page Number that has not yet been read by the controller 202 as it sequentially reads the logical-to-physical address translation map 902. According to one embodiment, if the L-Page that is modified as a result of a write command is associated with an L-Page Number that has already been processed for free space by the controller 202, as suggested by the "New Write 1" at reference numeral 1904 in FIG. 14, the controller 202 may carry out free space accounting in the manner described above. This free space accounting may be necessary in this case, as the controller 202 has already processed the entry corresponding to the now-updated L-Page for free space and has added the length thereof to its running count of valid data for the S-Block where the updated L-Page is stored. It is possible that the updated length is the same as the previous length of the L-page, in which case the running count of the valid data would be unchanged if the L-Page is written to the same S-Block. However, the accumulated size of the data in the S-Block would indeed change if the executed write resulted in a change to the length of the L-page or if written to a different S-Block. To maintain an accurate accounting of the free space in each S-Block, therefore, requires that the controller 202 go back and properly account for the free space made available as a result of the update to the L-Page.

If, however, the L-Page that is modified as a result of a write command is associated with an L-Page Number that has not yet been processed for free space by the controller 202, one embodiment allows the controller 202 to refrain from carrying out free space accounting activities and continue with its sequential read of the logical-to-physical address translation map 902. Indeed, if an executed write command results in an update to an L-Page whose L-Page Number is yet-to-be-read by the controller 202, such as is the case with "New Write 2" referenced at numeral 1906, no separate processing for free space accounting need be performed, as the controller 202 will correctly accumulate the size of valid data in the table 1702 when its pointer 1902 reaches the L-Page Number of the now newly-updated L-Page.

According to one embodiment, the blocks 206 of the non-volatile memory may comprise Multi-Level Cells (MLC) that store, for example, 2 bits per cell. For an MLC device, there is at least a lower page and an upper page, which may not be contiguous. The lower page of an MLC is typically programmed before the upper page thereof. Because of the distribution of cell voltages in MLC devices, there is the possibility of corrupting the lower page of an MLC if power is interrupted upon or during the programming the upper page. Indeed, during programming, the charge stored by the MLC is gradually increased, in a step-wise manner, until the desired voltage indicative of the desired logic state is reached. This is the reason that, according to one embodiment, the System Band where the S-Journals are stored may be configured to only use the lower pages in a block for increased reliability.

To further mitigate against lower page corruption errors, one embodiment utilizes a non-volatile buffer to temporarily store updated L-Pages at least until both the lower and upper pages of each MLC are programmed. As the lower and upper pages are not contiguous, the non-volatile store may be configured to be sufficiently large as to store both lower and upper pages of a MLC. That is, the non-volatile buffer may be configured to be at least sufficiently large to enable recovery from lower page corruption after a power loss to the data storage device. Such a non-volatile buffer is shown in FIG. 2 at reference numeral 211. The non-volatile buffer 211 may be configured as a circular buffer. The controller 202 may be configured, according to one embodiment, to accumulate data to be written to the non-volatile memory in the non-volatile buffer 211. To do so, the controller 202 may allocate space in the buffer 211 and write the accumulated data to the allocated space in the buffer 211. At least a portion of the accumulated data may then be stored in a lower page of the non-volatile memory and in the allocated space in the buffer 211. At some later point in time, the upper page corresponding to the previously-programmed lower page may itself be programmed, whereupon the previously-allocated space in the non-volatile buffer 211 may be de-allocated, to make room for further incoming data. Advantageously, the provision of such non-volatile buffer 211 and the temporary storage therein of newly-updated L-pages enables the controller 202 to generate and send a write acknowledgement to a host 218 after the accumulated data is written to the allocated space in the non-volatile buffer 211. This acknowledgement, therefore, may be sent sooner than would otherwise be the case were the acknowledgment sent after the data was programmed in the non-volatile memory, while avoiding the use of such backup-power mechanisms such as super capacitors or battery-backed NAND. For example, the non-volatile buffer 211 may comprise Magnetic Random Access Memory (MRAM), which operates at speeds comparable to DRAM while being storing data in a non-volatile manner. Using such non-volatile buffer 211 enables the controller, after the power is restored to the data storage device after a loss of power, to read data from the non-volatile buffer 211 and to store at least a portion of the read data in the non-volatile memory. As shown in FIG. 2 at 209, data may be accumulated, written and stored in the non-volatile buffer 211 in units of S-Pages.

According to one embodiment, the non-volatile buffer 211 enables the controller 202 to read L-pages stored in the non-volatile buffer 211 and to rebuild the logical-to-physical address translation map 902 using the logical pages read therefrom. During startup, when rebuilding the logical-to-physical address translation map 902, the controller 202 may be configured to read S-Journals in the System Band that correspond to L-pages stored in the Cold Band. The Cold Band may be that portion of the non-volatile memory allocated by the controller 202 that is designated for storage of recently garbage collected L-Pages. It is possible, however, that the Cold Band stores "unsafe" L-page data at lower pages for which the corresponding upper page has not yet been programmed. Such lower-page data could be at-risk of lower page corruption should a write command be executed by the controller, which results in the programming of the corresponding upper page. This lower-page corruption could, therefore, affect the coherency of the logical-to-physical address translation map 902, resulting in an error that could be potentially fatal to the data storage device.

According to one embodiment in which the non-volatile memory comprises MLC, upon rebuilding the logical-to-physical address translation map 902, the controller 202 may be configured to read S-Journals corresponding to the Cold Band no further than entries thereof corresponding to safe L-pages stored in a lower page where the corresponding upper page has been programmed. This ensures that no later-executed write command could result in a lower page corruption of data used to rebuild the logical-to-physical address translation map 902. Also according to one embodiment, for entries of S-Journals corresponding to the Cold Band corresponding to unsafe L-pages stored in a lower page where the corresponding upper page has not been programmed, the controller 202 may be further configured to stop processing S-Journals containing entries corresponding to such unsafe L-Pages and to instead read the unsafe L-Pages from the non-volatile buffer 211 and write them to non-volatile memory. This, in turn, generates updates to the logical-to-physical address translation map 902 and corresponding S-Journal entries and/or new S-Journals. This procedure may be carried out for one or more last-written S-Blocks referenced by the S-Journal(s) containing such entries (e.g., entries of S-Journals corresponding to the Cold Band that includes unsafe L-pages stored in a lower page where the corresponding upper page has not been programmed). Such one or more S-Blocks may then be garbage collected. In this manner, the non-volatile buffer 211 may be used to recover potentially unsafe L-Pages during reconstruction of the logical-to-physical address translation map 902 (stage 1 map rebuild of FIG. 11) and to properly schedule garbage collection (stage 2 of map rebuild of FIG. 11). In other embodiments, the additional processing related to unsafe pages is performed for other type of data (in lieu of the Cold Band data.

Figure 1:
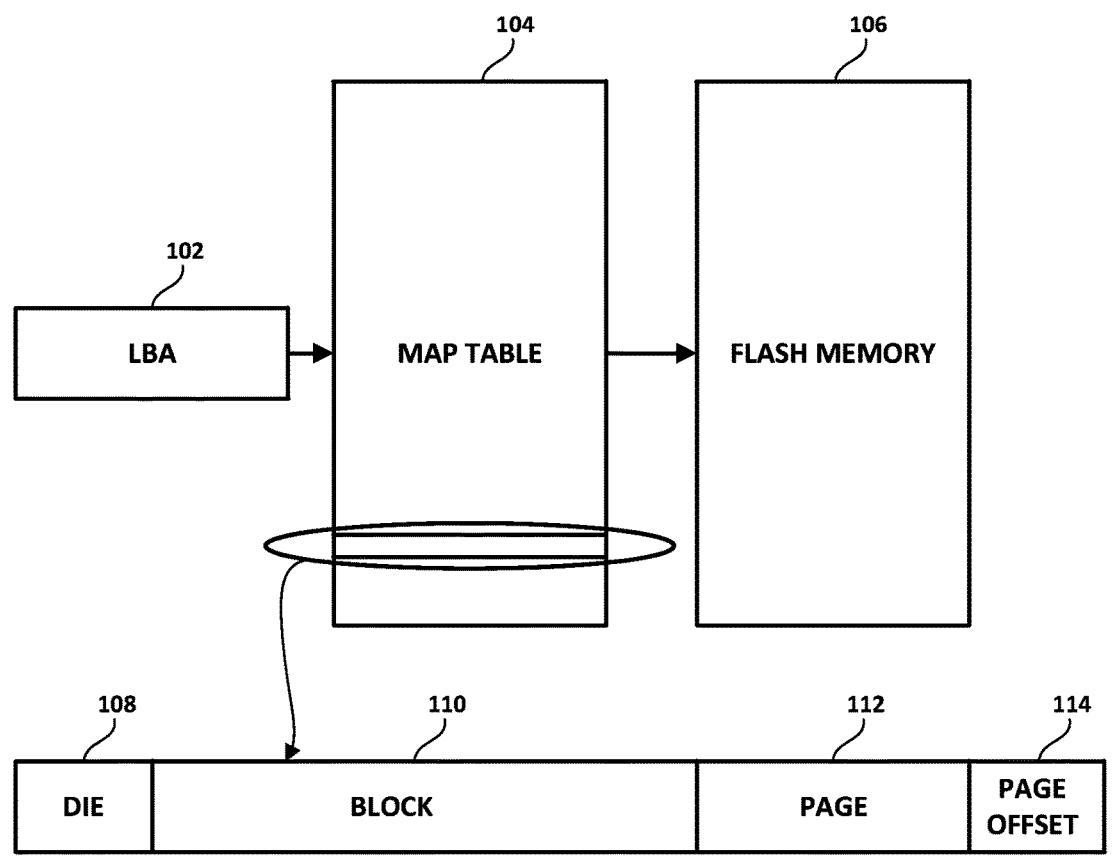
FIG. 1 shows aspects of a conventional Logical Block Addressing scheme for SSDs.

For example, consider a 3.2 TB data storage device. Conventional data storage devices may be required to read the volatile memory where the map table 104 (FIG. 1) is to be stored. This, in turn, requires an initialization procedure, as the ECC in the volatile memory has not been set. This may take on the order of, for example, 2 seconds, assuming volatile memory size on the order of 16 GB. Thereafter, the conventional data storage device may have to perform 16 GB of writes interleaved with 16 GB of random reads to rebuild the map table 104 and to update the free space information. Only thereafter may the conventional data storage device report that it is ready to accept and service host commands. In contrast, to carry out the present two-stage power-up procedure, one embodiment does not require reading the volatile memory beforehand and thus does not require reading the volatile memory until all entries have been written. Indeed, according to one embodiment, prior to leaving the manufacturing facility, the data storage device may be TRIMed (all physical pages of the subjected to the TRIM command or some functional equivalent), to thereby pre-populate the logical-to-physical address translation map 902 with valid entries. Thereafter, 16 GB of random writes to the volatile memory may be carried out to process all of the S-Journals from the non-volatile memory to the now-rebuilt and coherent logical-to-physical address translation map 902. At this early stage and before carrying out any free space accounting activities, the controller 202 may report that it is ready to service host data access commands. Thereafter, after having reported that it is ready to execute data access commands, the controller 202 may carry out 6.4 GB of sequential volatile memory reads to update the valid data table 1702 (FIG. 13) as part of its free space accounting activities. Thereafter, while or after carrying out data access commands, the data storage device may select the best S-Block(s) to garbage collect. According to one embodiment, the controller 202 may be configured to choose such S-Block(s) for garbage collection based at least in part upon the amount of free space available therein. According to one embodiment, the controller 202 may select that S-Block(s) having the most free space for garbage collection. Advantageously, according to one embodiment, such free space accounting and block picking may be carried out in hardware and on a drive that is accepting and executing data access commands.

Garbage Collection

FIGS. 15-18 are block diagrams illustrating aspects of garbage collection, according to one embodiment. The user S-Block information table 906 (FIG. 10A) may be scanned to select the "best" S-Block to garbage collect. There are a number of criteria that may be evaluated to select which S-Block to garbage collect. For example, the best S-Block to garbage collect may be that S-Block having the largest amount of free space and the lowest Program Erase (PE) count. Alternatively, these and/or other criteria may be weighed to select the S-Block to be garbage collected. For purposes of example, the S-Block selected to be to garbage collected in FIGS. 15-18 is S-Block 15, shown at 1502. It is to be noted that the user S-Block information table 906 (FIG. 10A) may comprise, among other items of information, a running count of the number of PE cycles undergone by each tracked S-Block, which may be evaluated in deciding which S-Block to garbage collect. As shown at 1502, S-Block 15 has a mix of valid data (hashed blocks) and invalid data (non-hashed blocks).

Figure 15:
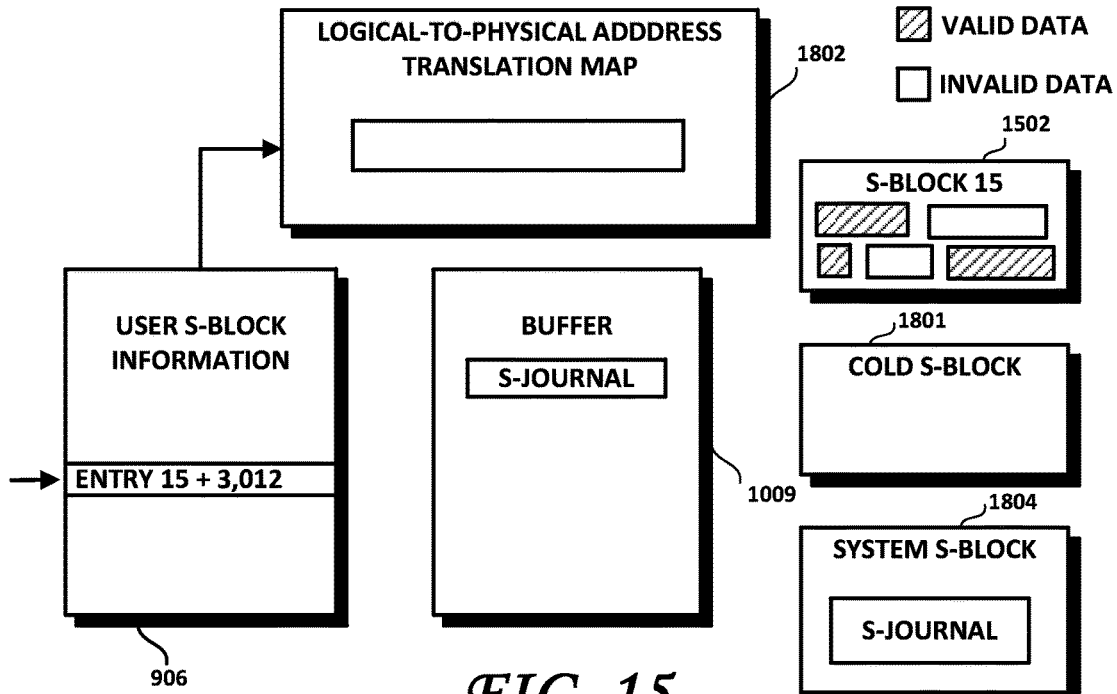
FIG. 15 is a block diagram illustrating aspects of garbage collection, according to one embodiment.
Figure 16:
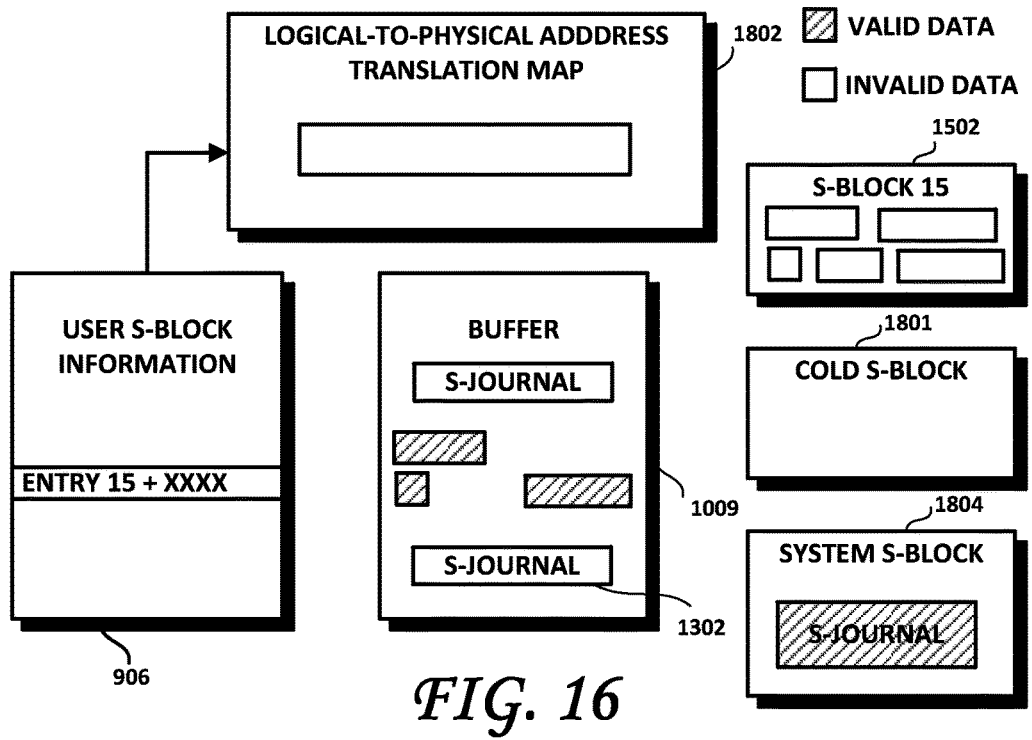
FIG. 16 is a block diagram illustrating further aspects of garbage collection, according to one embodiment.
Figure 17:
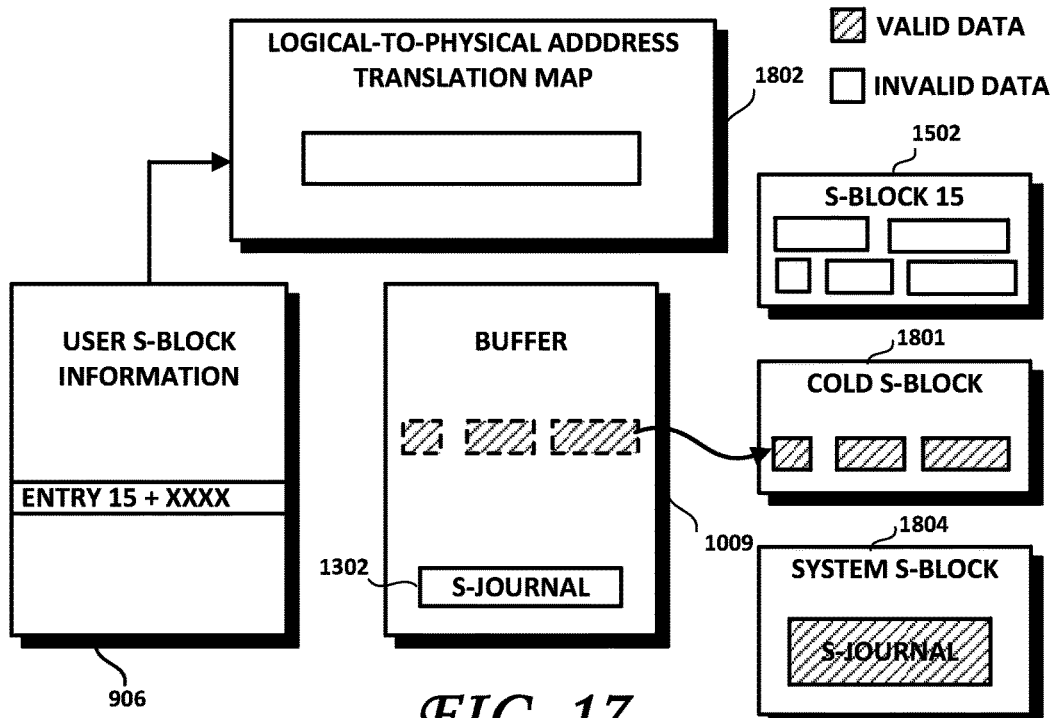
FIG. 17 is a block diagram illustrating still further aspects of garbage collection, according to one embodiment.
Figure 18:
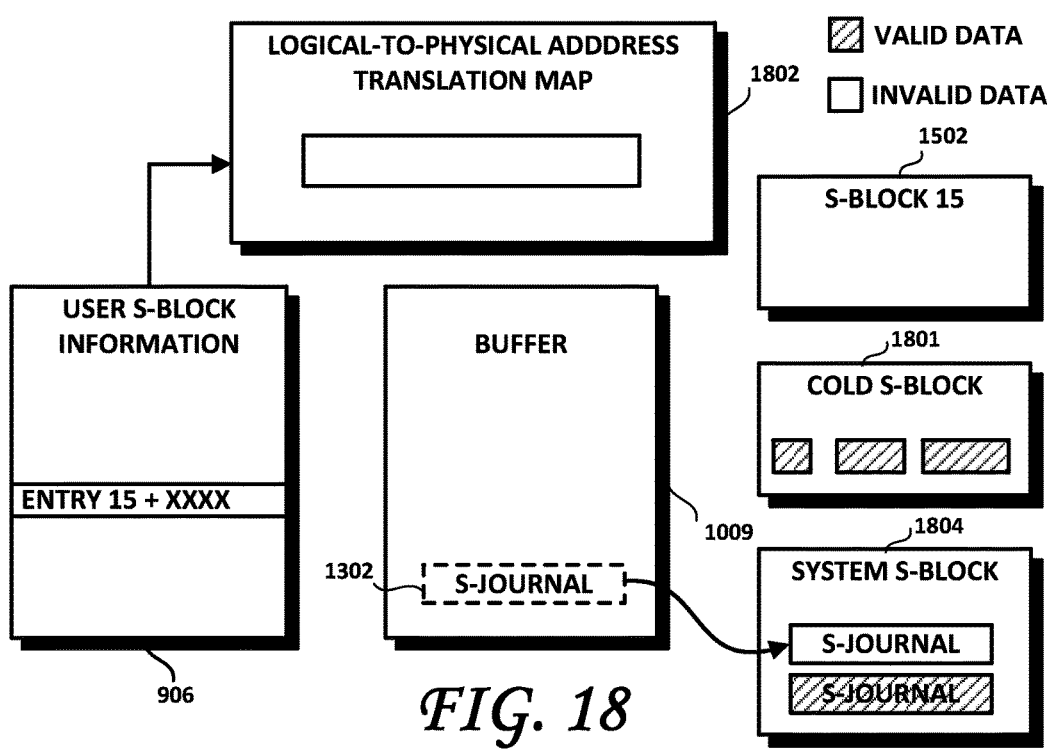
FIG. 18 is a block diagram illustrating yet further aspects of garbage collection, according to one embodiment.

Now that S-Block 15 has been selected for GC, the S-Journal Map (see 904 in FIG. 10B) may be consulted (e.g., indexed into by the S-Block number) to find the location in non-volatile memory of the corresponding S-Journal(s) for that S-Block. The S-Journal pointed to by the S-Journal Map 904 is then located using the header (e.g., 27 LSB) of S-Journal Number, and read into the buffer 1009, as shown in FIG. 15. That is, the E-Page in the System S-Block 1804 pointed to by S-Journal Map 904 (FIG. 10B) may be accessed and the S-Journal stored beginning at that location may be read into the buffer 1009. Thereafter, each physical to logical entry in the S-Journal in the buffer 1009 may then be compared to the corresponding entry in the logical-to-physical address translation map 1802. That is, the address of the L-Page in the S-Journal may be compared with the address of the L-Page in the logical-to-physical address translation map 1802. For each entry in the S-Journal in the buffer 1009, it may be determined whether the address for the L-Page of that entry matches the address of the L-Page in the corresponding entry in the logical-to-physical address translation map 1802. If the two match, that entry is valid. Conversely, if the address for the L-Page in the S-Journal does not match the entry for that L-Page in the logical-tophysical address translation map 1802, that entry in the S-Journal is not valid. According to one embodiment, as valid entries are found in the S-Journal whose entries are being parsed and compared, they may be written to the buffer 1009, as shown in FIG. 16. After processing each S-Journal for S-Block 15, as also shown in FIG. 16 at reference 1502, S-Block 15 now contains only invalid data. As the entries in the S-Journal in System S-Block 1804 point to such invalid data, the S-Journal in System S-Block 1804 is shown as being hashed, indicating that it is now stale. The logical-to-physical address translation map 1802 may then be updated, generating a new E-Page starting address for the valid data read into the buffer 1009. It is to be noted that during the update of the logical-to-physical translation map, the map 1802 may be rechecked for valid entries and may be locked during the map update process to guarantee atomicity. The valid data may then be written out to the Cold S-Block 1801 (the Hot Block being used for recently written host data, not garbage collected data), as shown at FIG. 17. In turn, this generates a new S-Journal for the Cold S-Block 1801, as shown at 1302 in FIG. 18. At some later time (e.g., after a sufficient number of entries have been populated), S-Journal 1302 may be written out to the System S-Block 1804 in the System Band. S-Block 15 has now been garbage collected and its space may now be added to the free space accounting for S-Block 15 in the data S-Block information 908. System S-Block Information 908 now indicates that the entire S-Block 15 is free space, which may thereafter be erased, its PE count updated and made available for host data. It is to be noted that an invalid S-Journal is still present in S-Block 15. The space in Flash memory in the System Band occupied by this invalid S-Journal may be garbage collected at some later time, erased and re-used.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device controller configured to couple to a non-volatile memory comprising a plurality of blocks, each block being configured to store a plurality of physical pages at predetermined physical locations, the controller comprising:

a processor configured to program data to and read data from the non-volatile memory, the data being stored in a plurality of logical pages;

a volatile memory comprising a logical-to-physical address translation map configured to enable the processor to a physical location, within one or more physical pages, of the data stored in each logical page; and a plurality of journals stored in the non-volatile memory, each journal comprising a plurality of journal entries associating one or more physical pages to each logical page, wherein each of the plurality of journals covers a predetermined range of physical pages within one of the plurality of blocks;

wherein the controller is configured, upon startup, to:

read each of the plurality of journals in an order and to rebuild the map in the volatile memory from the read plurality of journals;

indicate a readiness to process data access commands after the map is rebuilt; and rebuild a table from the map and select, based on the rebuilt table, at least one of the plurality of blocks for garbage collection after having indicated the readiness to process data access commands, wherein the table is configured to specify free space in each of the plurality of blocks.

2. The data storage device controller of claim 1, wherein the table is configured to specify free space in each of the plurality of blocks, wherein each of the blocks has a predetermined size and wherein the processor is configured to calculate the amount of free space by subtracting a size of valid data in each block obtained from reading the map from the predetermined size.

3. The data storage device controller of claim 2, wherein the processor is further configured to read sequentially through the map to determine, for each block, a size of valid data and to update a valid size information table with the determined size of valid data.

4. The data storage device controller of claim 3, wherein the processor is further configured to carry out a separate free space accounting operation to update a free space for a block storing a logical page corresponding to an already read entry of the map that is updated after having indicated the readiness to service data access commands.

5. The data storage controller of claim 3, wherein the processor is further configured to refrain from carrying out a separate free space accounting operation to update a free space for a block storing a logical page corresponding to a yet-to-be-read entry of the map that is updated after having indicated the readiness to service data access commands.

6. A method of controlling a data storage device comprising a non-volatile memory comprising a plurality of blocks, each block being configured to store a plurality of physical pages at predetermined physical locations, the method comprising:

programming data to and reading data from the non-volatile memory, the data being stored in a plurality of logical pages;

maintaining, in a volatile memory, a logical-to-physical address translation map configured to enable a determination of a physical location, within one or more physical pages, of the data stored in each logical page; and maintaining, in the non-volatile memory, a plurality of journals, each journal comprising a plurality of journal entries associating one or more physical pages to each logical page, wherein each of the plurality of journals covers a pre-determined range of physical pages within one of the plurality of blocks and, upon startup:

reading each of the plurality of journals in an order and rebuilding the map in the volatile memory from the read plurality of journals;

indicating a readiness to process data access commands after the map is rebuilt; and one of the plurality of blocks for garbage collection after having indicated the readiness to process data access command, wherein the table is configured to specify an amount of free space in each of the plurality of blocks, wherein the table is configured to specify an amount of free space in each of the plurality of blocks.

7. The method of claim 6, wherein each of the blocks has a predetermined size and wherein the method further comprises calculating the amount of free space by subtracting a size of valid data in each block obtained from reading the map from the predetermined size.

8. The method of claim 7, further comprising reading sequentially through the map to determine, for each block, a size of valid data and updating a valid size information table with the determined size of valid data.

9. The method of claim 8, further comprising carrying out a separate free space accounting operation to update a free space for a block storing a logical page corresponding to an already read entry of the map that is updated after having indicated the readiness to service data access commands.

10. The method of claim 7, further comprising refraining from carrying out a separate free space accounting operation to update a free space for a block storing a logical page corresponding to a yet-to-be-read entry of the map that is updated after having indicated the readiness to service data access commands.

* * * * *